Dec. 8, 1959        W. P. DYKE ET AL        2,916,668
HEAT STABILIZED FIELD EMISSION ELECTRON SOURCES
Filed July 1, 1955        2 Sheets-Sheet 1
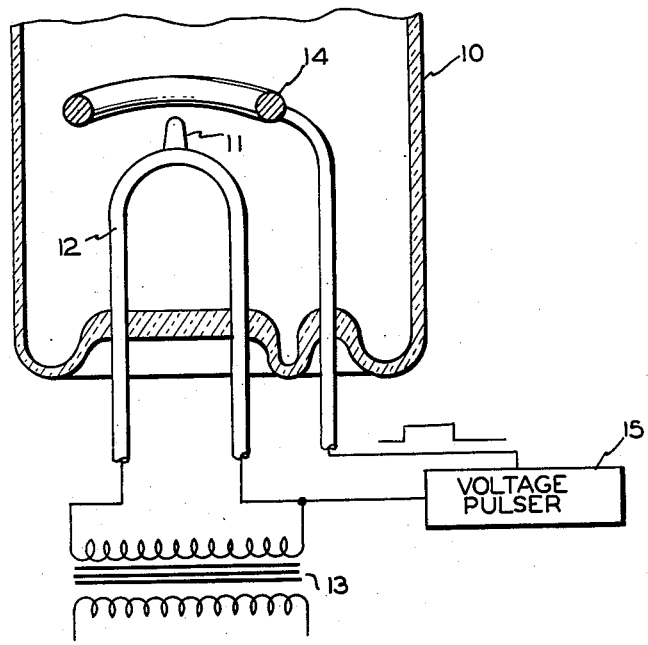
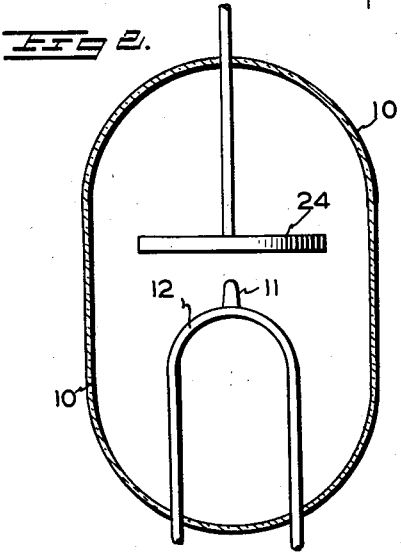
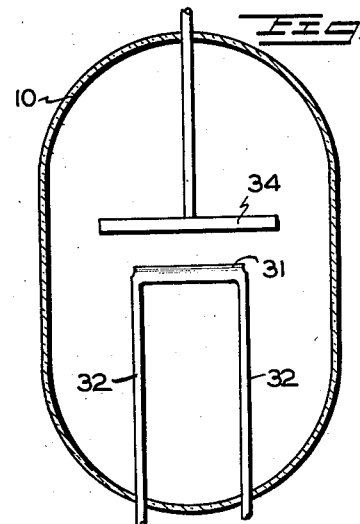
INVENTOR
WALTER P. DYKE
JOHN P. BARBOUR
BY *Harold T. Stowell*
ATTORNEY Dec. 8, 1959 W. P. DYKE ET AL 2,916,668
HEAT STABILIZED FIELD EMISSION ELECTRON SOURCES
Filed July 1, 1955 2 Sheets-Sheet 2
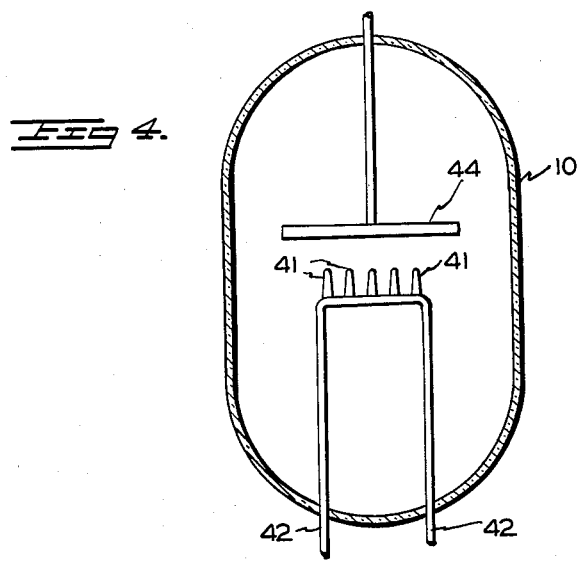
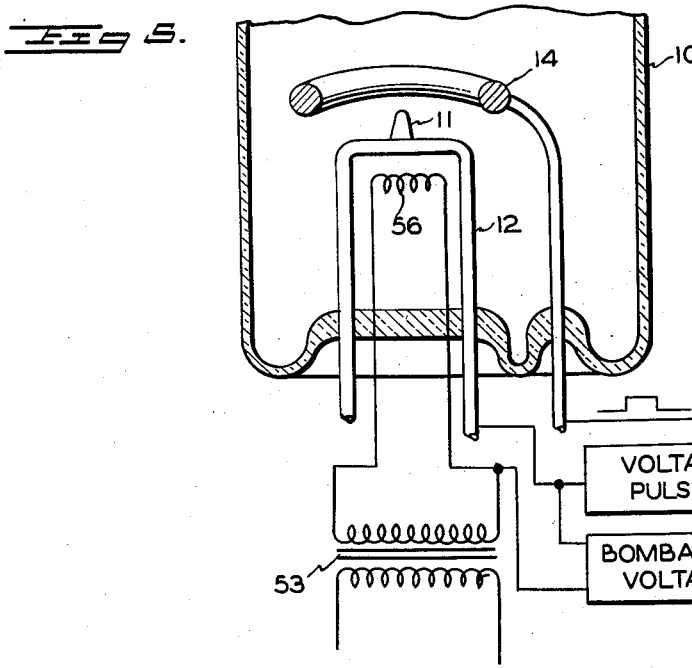
INVENTOR
WALTER P. DYKE
JOHN P. BARBOUR
BY *Harold T. Stowell*
ATTORNEY

United States Patent Office 2,916,668
Patented Dec. 8, 1959

2,916,668

HEAT STABILIZED FIELD EMISSION ELECTRON SOURCES

Walter P. Dyke and John P. Barbour, McMinnville, Oreg., assignors to Research Corporation, New York, N.Y., a corporation of New York Application July 1, 1955, Serial No. 519,404

12 Claims. (Cl. 315—107)

This invention relates to electron sources utilizing the principles of field emission with added features and advantages which result in stabilizing the electrical performance through appropriately controlled heating of the cathode and to methods of operating.

A principal object of the invention is to provide an electron source which offers the unique advantages characteristic of field emission, and at the same time exhibits stability and reproducibility of electrical performance to an extent not realized by previous methods and constructions.

Another object of the invention is to provide a field emission cathode of very small size and correspondingly minimized electrical capacity to other electrodes; the electron emission current density of which is both very large and subject to straightforward and direct electronic control, dependent on and sensitive to the value of the electric field at the cathode surface; the operation of which requires small or negligible energy supply to the cathode from outside sources; and in which emission arises virtually from a point source so that it may be refocussed by electron optical systems into a small spot or beam.

A further object is to provide a cathode having a current-voltage relationship which is stable and reproducible during continuous or intermittent operation for useful periods of time, and to maintain such performance in commercially available vacuum conditions, for example, at pressures less than $10^{-3}$ mm. of Hg.

Other objects and advantages of the invention will be apparent from the following discussion and the accompanying drawings.

There are many references in the literature and in the patent art to attempts to apply a cold cathode field emitter to practical electronic devices. The field emission devices heretofore described have not received widespread use in practice, because their electrical stability and useful operating life have been severely limited. On the other hand, the method and constructions of the present invention have resulted in stable and reproducible performance of field emission cathodes for long periods of operation at useful levels of power and duty cycle. Its application will make possible the development of electronic devices heretofore thought impractical.

The objects and advantages outlined above are attained by subjecting a field emission cathode to a pulsed electric field while maintaining the cathode at a temperature high enough to provide differential evaporation of contaminants and smoothing of the cathode surface by surface migration and low enough to avoid undue changes in cathode geometry.

Constructions and energizing circuits illustrating the principles of the invention are shown in the accompanying drawings, in which:

Fig. 1 is a diagrammatic sectional elevation with portions broken away of a typical electron source construction of the invention with associated energizing circuits, Figs. 2, 3 and 4 are partial diagrammatic views of electron source devices of the invention having various forms of electrodes, and Fig. 5 is a diagrammatic representation of an electron source device embodying a modified form of cathode heating circuit.

In all of the figures, the electrode structures are greatly enlarged in relative size for greater clarity of representation.

A typical embodiment of the invention is shown in Fig. 1. In an evacuated envelope 10, a metallic cathode 11, of smooth surface and small radius of curvature, is mounted on a support filament 12. The filament 12 is raised to an intermediate temperature, for example, about 2000° K. by the passage through it of an electric current from external source, for example, transformer 13. A large value of electric field at the cathode surface is established by applying suitable electric potentials to nearby electrodes, which may, for example, have the form of a ring 14 which permits electrons to pass through for further control or utilization in the space beyond. The cathode is maintained by heat conduction from support 12 at a suitable temperature, the range, purposes and sources of which are discussed below. Electrons are emitted under the influence of the large electric field only at the highly curved cathode surface (cathode tip) where the field is high. Electron emission from support structures and filament is negligible.

The potential is applied as a pulse of duration, preferably less than a second at the higher fields used (say $7 \times 10^7$ v./cm.) or less than a few minutes at the lower fields (say $3 \times 10^7$ v./cm.); electron currents are drawn from the cathode only during the voltage pulse which is supplied by the pulser circuit 15. The potential is then reduced to a low, or zero, value for an interval, for example, four times as long as the voltage pulse, after which the potential may be applied again and the process repeated. Under such conditions, tungsten cathodes, for example, have been found to have stable and reproducible electrical behavior at useful levels of power and for long operating periods. The heated cathode, however, is not stable under continuous application of high electric field, for the reasons indicated in the following discussion. It has been found that the field pulses should not be applied at a duty cycle which exceeds about 0.25.

Field emission current is sensitively dependent on the surface electric field, which varies in part as a function of cathode geometry, and on surface work function. Application of heat maintains constant surface geometry by removing sub-microscopic irregularities through surface or volume diffusion which are preferential at surfaces of small radius of curvature. It maintains constant work function by continuously evaporating surface impurities without appreciable evaporation of the base metal, most such impurities being of substantially lower evaporation energy than the usual cathode metals.

The range of temperature useful for such purpose varies with the cathode metal, which may be tungsten, tantalum, rhenium, or other material. The temperature must be high enough to evaporate impurities characteristic of the metal used and of the environment, but low enough to avoid substantial thermionic emission and to prevent excessive dulling of the cathode through surface migration. A useful but not restrictive temperature range for tungsten has been found to be from 1500° K. to 2200° K. While a high cathode temperature usefully maintains a smooth, clean and hence electrically stable cathode surface, during pulsed electrical operation, the accompanying thermal agitation has two undesired effects which must be avoided: first, the sharpened cathode may be gradually dulled by surface migration, and second, impurities may be supplied to the emitting surface by volume or surface diffusion, i.e., from sources in the cathode. In particular, impurity centers in the cathode may become exposed, to the cathode surface, during the dulling process.

Fortunately, the rate of dulling decreases as the inverse third power of the increasing radius of curvature of a surface, with the practical result that dulling is negligible for radii above a certain size. For tungsten, dulling is negligible for radii greater than $r=6.5 \times 10^{-5}$ cm., at the preferred temperatures given above. Furthermore, most applications of the invention will involve the use of cathodes having radii larger than that value, and will therefore not suffer from dulling.

Cathodes of small radius are useful in some applications and are subject to more rapid dulling; however, a modification of the method of the invention will prevent such dulling while conserving the often desirable operating characteristics of small emitters. A continuous electric field of a fraction (say, for example, one-half) the magnitude required for appreciable field emission is maintained at the cathode surface, while a superimposed intermittent pulsed field of higher value permits useful emission to be drawn. The continuous field establishes an equilibrium between accompanying electrostatic forces and the curvature-related forces involved in dulling, effectually preventing the latter.

In the form of the invention shown diagrammatically in Fig. 2 a metallic plate anode 24 intercepts the electrons from cathode 11 forming a simple diode structure useful for such purposes as the generation of X-rays. Energization of the device and heating of the cathode may be effected by the means described in connection with Fig. 1 or by any of the means hereinafter described.

Continuous application of high field to a heated emitter is not practicable, because it results in deformation of the curved surface into a more or less polyhedral shape known in the literature as "build-up," which leads to instability and electrical breakdown. In pulsed operation, however, any tendency to such distortion during the field-on period is counteracted and the smooth, curved surface restored during the period between pulses.

The total current expected from field cathodes is the product of emitting area and current density. For example, if the latter is $10^7$ amps./cm.$^2$, a level expected to be useful in practice, then the total current I yielded by a needle-shaped cathode with tip radius $r$ at applied voltage V is approximately as follows:

| r (cm.) | V (kv.) | I (amps) |
|---|---|---|
| $2 \times 10^{-5}$ | 5 | .05 |
| $5 \times 10^{-5}$ | 15 | .2 |
| $3 \times 10^{-4}$ | 100 | 6.5 |

Here a needle of 15° cone angle and an anode-cathode spacing of 1 cm. are assumed. Closer spacing will increase the field and hence the current at a given voltage. Simultaneously operated parallel emitters as shown at 41 in Fig. 4 have been successfully used for the purpose of increasing the total current to levels considerably greater than those tabulated above. Higher potentials permit the use of other cathode geometries, such as the "razor edge" emitter shown at 31 in Fig. 3, with larger area and hence larger total current.

The source of the heat used for stabilization may be the supporting filament heated by an electric current from external source as shown in Fig. 1. Alternate heating methods include bombardment by particles from other sources, radiation from nearby auxiliary surfaces, induction heating, and resistive heating generated in the cathode itself by the passage of the emission current. The principles of the invention, however, are not dependent on any particular source of heat. A suitable arrangement for use with bombardment or radiation heating is illustrated in Fig. 5.

In the device of Fig. 5, the cathode 11 is heated by electron bombardment from filament coil 56 which is heated by current from transformer 53. A suitable potential is maintained between coil 56 and cathode support 12 by a voltage from voltage source 57.

Advantage has been taken of the principles of operation of the present invention to miniaturize the structure to such an extent that the overall dimension of the cathode-support assembly 11, 12 as shown, for example, in Figs. 1 and 2 is of the order of $10^{-2}$ cm. Advantages of such a structure includes its low power requirement, negligible thermal expansion, and the short time required for heating and cooling ($10^{-3}$ sec.), as well as mechanical strength due to very small inertia.

The combination of high cathode field, intermediate temperature, and intermittent pulsed application of the electric field are characteristic and novel features of this invention. Under such conditions, the cathode is electrically stable in spite of bombardment of the cathode by positive ions, and in spite of contamination by incident foreign material.

The heat-stabilized field emission cathode devices described herein may be used in a variety of practical electronic devices, including, for example, X-ray generation, high frequency generation, oscillography, electron microscopy, voltage control, rectification, electro-mechanical transducers and others.

A discussion of field emission cathode structures suitable for use in the present invention and a disclosure of methods of making them will be found in applications Serial No. 407,700 filed February 2, 1954, now Patent No. 2,817,002, by W. P. Dyke and J. K. Trolan and Serial No. 407,709, filed February 2, 1954, now abandoned, by D. M. Barney and J. L. Boling.

We claim:

1. A method of producing electron emission from a field emission cathode of refractory metal having a pointed portion to an electron collector which comprises heating the cathode to a temperature which lies slightly below the temperature at which substantial thermionic electron emission occurs to thereby effectively provide differential evaporation of contaminants within the cathode and smoothing of the cathode surface by surface migration while avoiding substantial changes in gross cathode geometry and applying a pulsed electric field to the cathode to hereby cause substantial electron emission from the cathode during the pulses thereof.

2. A method as defined in claim 1 wherein the electric field pulses are applied at a duty cycle not exceeding about 0.25.

3. A method as defined in claim 1 wherein a continuous electric field is maintained at the cathode between the electric field pulses at a value substantially lower than the value of the pulses.

4. A method of operating field emission devices having a tungsten cathode and an electron collector which comprises applying to the cathode electric field pulses and heating the cathode to a temperature of from about 1500° K. to about 2200° K.

5. A method as defined in claim 4 wherein the electric field pulses are applied at a duty cycle not exceeding about 0.25.

6. A method as defined in claim 4 wherein a continuous electric field is maintained at the cathode between the electric field pulses at a value substantially lower than the value of the pulses.

7. A field emission electron source comprising a field emission cathode of refractory metal having a portion of substantially pointed configuration and a complementary anode, means in operative association with the cathode for heating the same to a temperature slightly below the temperature of substantial thermionic electron emission, and means for applying a pulsed electric field to the cathode to effect a flow of electrons from the cathode to the anode.

8. A field emission device as defined in claim 7 including means for maintaining between said cathode and anode a continuous potential difference substantially lower than the value of the pulses.

9. A field emission device as defined in claim 7 wherein the cathode assembly has a maximum overall dimension of the order of $10^{-2}$ cm.

10. A field emission device as defined in claim 7 wherein the cathode is heated by conduction from a heated metallic support member.

11. A field emission device as defined in claim 10 wherein the support member is resistively heated.

12. A field emission device as defined in claim 10 wherein the support member is heated by bombardment with charged particles from an adjacent member maintained at a suitable potential with respect to the support member.

References Cited in the file of this patent

UNITED STATES PATENTS

| | | |
|---|---|---|
| 1,522,305 | Latour | Jan. 6, 1925 |
| 1,639,805 | McCullough | Aug. 23, 1927 |
| 1,699,146 | Hull | Jan. 15, 1929 |
| 1,749,780 | Rentschler | Mar. 11, 1930 |
| 2,156,752 | Daene | May 2, 1939 |
| 2,786,955 | Trolan | Mar. 26, 1957 |

OTHER REFERENCES

Samuel C. Miller: Neon Signs, pages 45–55, McGraw-Hill, New York, New York, 1935.

UNITED STATES PATENT OFFICE

CERTIFICATE OF CORRECTION

Patent No. 2,916,668                                                                 December 8, 1959

Walter P. Dyke et al.

It is hereby certified that error appears in the printed specification of the above numbered patent requiring correction and that the said Letters Patent should read as corrected below.

Column 4, line 46, for "hereby" read -- thereby --.

Signed and sealed this 10th day of May 1960.

(SEAL)
Attest:

KARL H. AXLINE
Attesting Officer

ROBERT C. WATSON
Commissioner of Patents